United States Patent
Ichikawa et al.

(10) Patent No.: US 8,646,585 B2
(45) Date of Patent: Feb. 11, 2014

(54) NON CONTACT POWER TRANSFER DEVICE AND VEHICLE EQUIPPED THEREWITH

(75) Inventors: Shinji Ichikawa, Toyota (JP); Atsushi Mizutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 198 days.

(21) Appl. No.: 13/123,422

(22) PCT Filed: Oct. 9, 2008

(86) PCT No.: PCT/JP2008/068360
§ 371 (c)(1),
(2), (4) Date: Jun. 29, 2011

(87) PCT Pub. No.: WO2010/041321
PCT Pub. Date: Apr. 15, 2010

(65) Prior Publication Data
US 2011/0254378 A1    Oct. 20, 2011

(51) Int. Cl.
*B60L 1/00* (2006.01)
(52) U.S. Cl.
USPC .............................................. 191/2
(58) Field of Classification Search
USPC ......... 191/2–7, 10, 22 R, 22 C; 307/104–106
See application file for complete search history.

(56) References Cited

U.S. PATENT DOCUMENTS

| | | | |
|---|---|---|---|
| 7,741,734 B2 | 6/2010 | Joannopoulos et al. | |
| 2007/0222542 A1 | 9/2007 | Joannopoulos et al. | |
| 2008/0265684 A1* | 10/2008 | Farkas | 307/104 |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

OTHER PUBLICATIONS

Kurs et al., "Wireless Power Transfer via Strongly Coupled Magnetic Resonances," *Science*, Jul. 6, 2007, pp. 83-86, vol. 317, <www.sciencemag.org>.

(Continued)

*Primary Examiner* — R. J. McCarry, Jr.
(74) *Attorney, Agent, or Firm* — Oliff PLC

(57) ABSTRACT

A non contact electric power transfer device includes: a self resonant coil; an induction coil capable of transmitting and receiving electric power to and from an induction coil capable of the self resonance coil through electromagnetic induction; and a bobbin that has at least one of the self resonant coil and the induction coil attached thereto, and has an accommodation chamber defined therein and capable of accommodating a device therein.

15 Claims, 11 Drawing Sheets

(56) References Cited

U.S. PATENT DOCUMENTS

| | | | |
|---|---|---|---|
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-2000-50511 | 2/2000 |
| JP | A-2000-115915 | 4/2000 |
| JP | A-2005-149238 | 6/2005 |
| JP | A-2006-320072 | 11/2006 |
| JP | A-2009-501510 | 1/2009 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

OTHER PUBLICATIONS

International Search Report for International Patent Application No. PCT/JP2008/068360, mailed on Jan. 13, 2009 (w/ English translation).

* cited by examiner

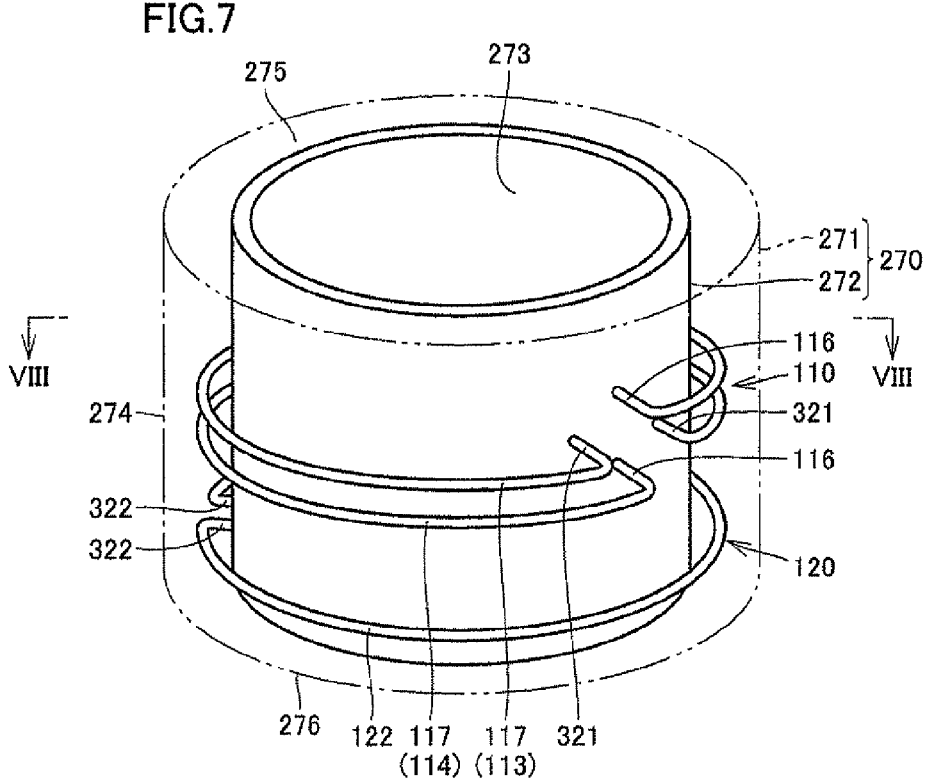
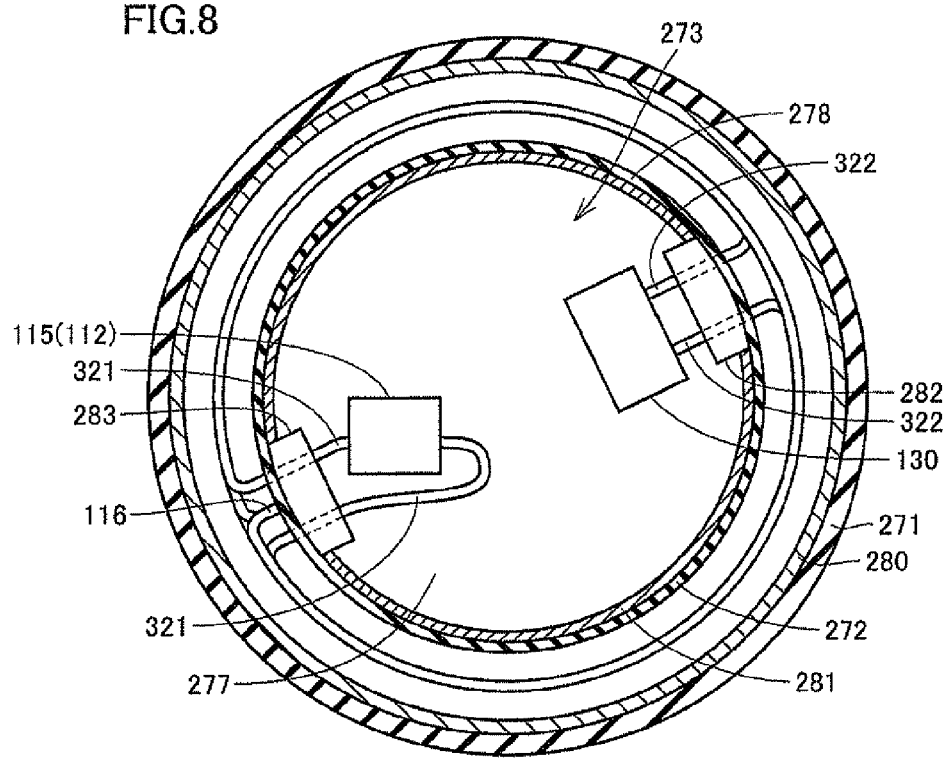

NON CONTACT POWER TRANSFER DEVICE AND VEHICLE EQUIPPED THEREWITH

TECHNICAL FIELD

The present invention relates generally to a non contact power transfer device and a vehicle equipped therewith, and particularly to technology employed to transfer electric power from a power supply external to a vehicle to the vehicle in a non contact manner.

BACKGROUND ART

Today, a considerable amount of attention is riveted to electrically powered vehicles, such as an electric car and a hybrid car, as environment-friendly vehicles. These vehicles are equipped with an electric motor for generating a traveling drive force and a rechargeable power storage device for storing electric power to be supplied to the electric motor. Examples of the hybrid car are a vehicle equipped with an internal combustion engine as a power source in addition to the electric motor, and a vehicle equipped with a fuel battery as a direct current power source for driving the vehicle in addition to the power storage device.

In some known hybrid cars, an in-vehicle power storage device can be charged by an electric power source outside of the vehicle as with electric cars. An example of such hybrid cars is, what is called, a "plug-in hybrid car", in which a household electric power source can be used to charge the power storage device such that a vehicle charging port is connected to a plug socket provided in a house by a charging cable.

Meanwhile, a power transmission method attracting attention in recent years is wireless power transmission in which neither a power supply code nor a power transmission cable is used. Three known technical methods are prevalently employed in the wireless power transmission; power transmission by using electromagnetic induction, power transmission by using electromagnetic wave, and power transmission by using a resonance technique.

Of these techniques, the resonance technique is a non-contact power transmission technology wherein a pair of resonators (for example, a pair of self resonant coils) is resonated in an electromagnetic field (near field) so that electric power is transferred by way of the electromagnetic field. This technique enables the transmission of such a large electric power as a few kW over a relatively long distance (for example, a few meters) (see the Patent Document 1 and Non-Patent Document 1).

Patent Document 1: WO 2007/008646
Non-Patent Document 1: Andre Kurs et al., "Wireless Power Transfer via Strongly Coupled Magnetic Resonances", [online], Jul. 6, 2007, SCIENCE, Volume 317, pp. 83-86, [Searched on Sep. 12, 2007], Internet <URL; http://www-.sciencemag.org/cgi/reprint/317/5834/83.pdf>

DISCLOSURE OF THE INVENTION

Problems to be Solved by the Invention

A non contact electric power transfer device that utilizes resonance at least includes a self resonant coil and a bobbin having the self resonant coil attached thereto.

To cause the non contact electric power transfer device that utilizes resonance to function as a charging device, it further requires a primary coil, a rectifier and a large number of other attachment devices.

As a result, the non contact electric power transfer device that utilizes resonance that is adopted as a charging device or the like is increased in size, and to mount the device on a vehicle or the like, it is necessary to make the device per se compact.

The present invention has been made to address such an issue as described above, and a first object thereof is to provide a non contact electric power transfer device that utilizes resonance and is compact and a second object thereof is to provide a vehicle in which the non contact electric power transfer device is made compact.

Means for Solving the Problems

The present invention provides a non contact electric power transfer device including: a second self resonant coil capable of at least one of transmitting and receiving electric power to and from an opposite, first self resonant coil through magnetic field resonance; an induction coil capable of at least one of extracting the electric power that the second self resonant coil has received through electromagnetic induction, and feeding the second self resonant coil with electric power through electromagnetic induction; and a bobbin that has the second self resonant coil attached thereto and has an accommodation chamber defined therein and capable of accommodating a device therein.

Preferably, the second self resonant coil and the induction coil are mounted in a vehicle, the first self resonant coil is disposed external to the vehicle, the first self resonant coil transfers electric power to the second self resonant coil, the second self resonant coil receives the electric power transferred from the first self resonant coil, and the second self resonant coil and the induction coil configure at least a portion of a power reception device.

Preferably, the first self resonant coil is mounted in a vehicle, the second self resonant coil and the induction coil are disposed external to the vehicle, the second self resonant coil transfers electric power to the first self resonant coil, the first self resonant coil receives the electric power transferred from the second self resonant coil, and the second self resonant coil and the induction coil configure at least a portion of a power transmission device.

Preferably, the bobbin as seen axially is smaller in length than the bobbin as seen widthwise.

Preferably, the device accommodated in the bobbin at the accommodation chamber includes a capacitor connected to the second self resonant coil.

Preferably, the device accommodated in the bobbin at the accommodation chamber is adapted to be a switching device capable of switching a first state selected in a power reception mode and having the second self resonant coil magnetically coupled with the first self resonant coil through magnetic field resonance, and a second state selected in a non power reception mode and having the second self resonant coil magnetically coupled with the first self resonant coil through resonance less strongly than the first state.

Preferably, the second self resonant coil includes the coil's main body unit and an impedance variation unit varying the coil's main body unit in inductance, and the impedance variation unit is accommodated in the accommodation chamber.

Preferably, the coil's main body unit is divided at a center thereof into a first portion and a second portion. The impedance variation unit includes a relay provided at the center of the coil's main body unit and connecting the first portion and the second portion in a power reception mode and disconnecting the first portion and the second portion in a non power reception mode, and the relay is accommodated in the accommodation chamber.

Preferably, the second self resonant coil includes the coil's main body unit and a capacitance variation unit varying the coil's main body unit in capacitance, and the capacitance variation unit is accommodated in the accommodation chamber.

Preferably, the capacitance variation unit includes a lead connected to an end of the coil's main body unit, a relay connected to the lead, and a capacitor connected by the relay via the lead to the coil's main body unit in a power reception mode and disconnected by the relay from the coil's main body in a non power reception mode. At least one of the relay and the capacitor is accommodated in the accommodation chamber.

Preferably, the non contact electric power transfer device further includes a rectifier connected to the induction coil, and the rectifier is accommodated in the accommodation chamber.

Preferably, the non contact electric power transfer device further includes a voltage converter connected to the induction coil, and the voltage converter is accommodated in the accommodation chamber.

Preferably, the second self resonant coil includes: a wound portion spaced from an outer circumferential surface of the bobbin and wound along the outer circumferential surface of the bobbin; and a supporting portion connected to the bobbin and capable of supporting the wound portion.

The present invention provides a vehicle including the above described non contact electric power transfer device.

Effects of the Invention

The present non contact electric power transfer device and vehicle equipped therewith thus allow a non contact electric power transfer device to be made compact.

BRIEF DESCRIPTION OF THE DRAWINGS

FIG. 7 is a perspective view of a secondary self resonant coil, a secondary coil, and a vicinity thereof in configuration.

FIG. 8 is a cross section taken along a line VIII-VIII shown in FIG. 7.

DESCRIPTION OF THE REFERENCE SIGNS

Figure 1:
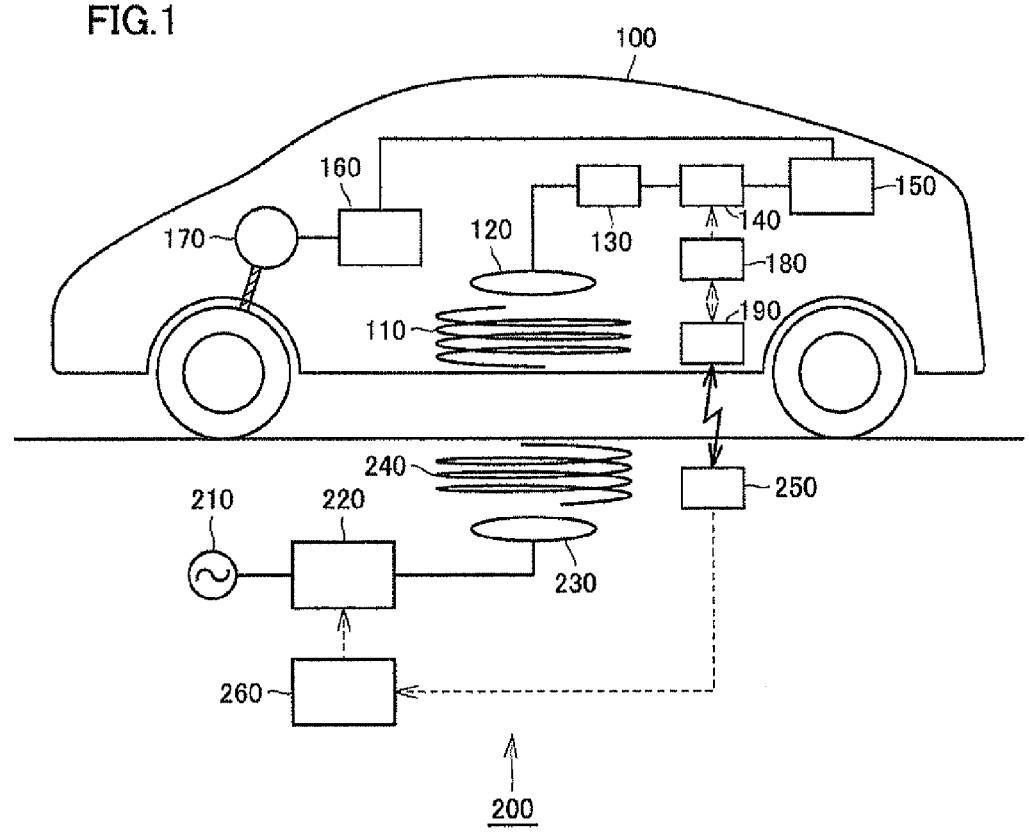
FIG. 1 is an overall view of a power feeding system in configuration according to a first embodiment of the present invention.

100: electrically powered vehicle, 110, 110A, 110B, 110C: secondary self resonant coil, 111: coil's main body unit, 112: relay, 115: impedance variation unit, 116: supporting portion, 117: wound portion, 120: secondary coil, 122: wound portion, 130: rectifier, 140: converter, 142: DC/AC conversion unit, 144: transformer unit, 146: rectification unit, 150: power storage device, 162: boost converter, 164, 166: inverter, 200: power feeding device, 210: alternating current power source, 220: high frequency electric power driver, 230: primary coil, 240: primary self resonant coil, 250: communication device, 270: coil accommodation unit, 271: cover, 272: bobbin, 273: accommodation chamber, 274: circumferential wall, 275: ceiling plate, 276: bottom, 277: bottom, 278: circumferential wall, 280: shield member, 281: shield member, 282: connector, 283: connector, 310: high frequency power source, 311: coil's main body unit, 312A, 312B, 312C: capacitance variation unit, 313: capacitor, 314: discharging resistor, 315: relay, 320: primary coil, 321, 322: lead, 330: primary self resonant coil, 340: secondary self resonant coil, 350: secondary coil, 360: load, 380: shield member, 381: shield member, 417: wound portion, 418: wound portion, 450: capacitor, 470: coil accommodation unit, 471: cover, 472: bobbin, 473: accommodation chamber.

BEST MODES FOR CARRYING OUT THE INVENTION

Hereinafter, embodiments of the present invention will be described in detail referring to the drawings. Any identical or corresponding constitutive elements are simply shown with the same reference symbols to avoid redundant description.

First Embodiment

FIG. 1 is an overall view of a power feeding system in configuration according to a first embodiment of the present invention. Referring to FIG. 1, the power feeding system is equipped with an electric power reception device (non-contact electric power transfer device) provided in an electrically powered vehicle 100, and a power feeding device (non-contact electric power transfer device) 200. The electric power reception device mounted in electrically powered vehicle 100 includes a secondary self resonant coil 110, a secondary coil 120, a rectifier 130, a DC/DC converter 140, and a power storage device 150. Electrically powered vehicle 100 further includes a power control unit (PCU) 160, a motor 170, a vehicular electronic control unit (ECU) 180, and a communication device 190.

Secondary self resonant coil 110 is provided in a lower section of the vehicle, however, may be provided in an upper section of the vehicle as far as power feeding device 200 can also be provided in the upper section of the vehicle. Secondary self resonant coil 110 is an LC resonant coil in which both ends are open (or not connected). Secondary self resonant coil 110 resonates with a primary self resonant coil 240 (described later) of power feeding device 200 by way of an electromagnetic field so that electric power is received from power feeding device 200. In this description, a coil stray capacitance is a capacitance component of secondary self resonant coil 110, or a capacitor to be connected to the both ends of the coil may be provided otherwise.

The number of windings of secondary self resonant coil 110 can be suitably set so that a Q value indicating a resonance strength between primary self resonant coil 240 and secondary self resonant coil 110 (for example, Q>100) and κ indicating a degree of coupling therebetween and the like show larger values based on a distance between secondary self resonant coil 110 and primary self resonant coil 240 of power feeding device 200 and resonance frequencies of primary self resonant coil 240 and secondary self resonant coil 110 and the like.

Secondary coil 120 is provided coaxial with secondary self resonant coil 110 and can be magnetically coupled with secondary self resonant coil 110 through electromagnetic induction. Secondary coil 120 retrieves electric power received by secondary self resonant coil 110 by using electromagnetic induction and outputs the retrieved power to rectifier 130. Rectifier 130 rectifies an alternating current electric power retrieved by secondary coil 120.

DC/DC converter 140 converts the electric power rectified by rectifier 130 into a voltage level of power storage device 150 based on a control signal transmitted from vehicular ECU 180 and outputs a conversion result thereby obtained to power storage device 150. In the case where electric power is received from power feeding device 200 while the vehicle is traveling (power feeding device 200 is provided in the upper section or either of side sections of the vehicle in that case), DC/DC converter 140 may convert the power rectified by rectifier 130 into a system voltage and directly send a conversion result thereby obtained to PCU 160. DC/DC convert 140 is not an indispensable constitutive element, and the alternating current electric power retrieved by secondary coil 120 may be rectified by rectifier 130 and then directly imparted to power storage device 150.

Power storage device 150 is a rechargeable direct current power source, including a lithium-ion or nickel-hydrogen secondary battery. In power storage device 150, electric power supplied from DC/DC converter 140 and regenerative electric power generated by motor 170 are stored. Then, power storage device 150 supplies the power stored therein to PCU 160. A capacitor having a large capacitance can be used as power storage device 150, and any electric power buffer is usable as far as it can temporarily store therein the electric power supplied from power feeding device 200 and the regenerative electric power generated by motor 170 and supply the stored power to PCU 160.

PCU 160 drives motor 170 using the electric power output from power storage device 150 or the electric power directly supplied from DC/DC converter 140. Further, PCU 160 rectifies the regenerative electric power generated by motor 170 and outputs the rectified regenerative electric power to power storage device 150 in order to charge power storage device 150. Motor 170 is driven by PCU 160, and a vehicle drive force thereby generated is output to driving wheels. Motor 170 generates electric power using a kinetic energy received from driving wheels and an engine not shown, and outputs the generated regenerative power to PCU 160.

When the vehicle is traveling, vehicular ECU 180 controls PCU 160 based on a traveling status of the vehicle and a state of charge (SOC) of power storage device 150. Communication device 190 is a communication interface for wirelessly communicating with power feeding device 200 outside of the vehicle.

Power feeding device 200 includes an alternating current power source 210, a high frequency electric power driver 220, a primary coil 230, a primary self resonant coil 240, a communication device 250, and an ECU 260.

Alternating current power source 210 is a power source provided outside of the vehicle, for example, a system power supply. High frequency electric power driver 220 converts electric power received from alternating current power source 210 into high frequency electric power and supplies the converted high frequency electric power to primary coil 230. The high frequency electric power generated by high frequency electric power driver 220 has a frequency in a range for example of 1 MHz to 10-odd MHz.

Primary coil 230 is provided coaxial with primary self resonant coil 240, and can be magnetically coupled with primary self resonant coil 240 through electromagnetic induction. Primary coil 230 supplies the high frequency electric power from high frequency electric power driver 220 to primary self resonant coil 240 by using electromagnetic induction.

Primary self resonant coil 240 is provided near the ground, or may be provided in the upper or side section of the vehicle in the case where electrically powered vehicle 100 is supplied with electric power from the upper section of the vehicle. Primary self resonant coil 240 is also an LC resonant coil in which both ends are open (or not connected). Primary self resonant coil 240 resonates with secondary self resonant coil 110 of electrically powered vehicle 100 by way of an electromagnetic field so that electric power is transmitted to electrically powered vehicle 100. In a manner similar to the earlier description, a capacitance component of primary self resonant coil 240 corresponds to a coil stray capacitance. However, a capacitor to be connected to the both ends of the coil may be provided.

The number of windings of primary self resonant coil 240 can also be suitably set so that the Q value (for example, Q>100) and κ indicating the degree of coupling and the like show larger values based on the distance between primary self resonant coil 240 and secondary self resonant coil 110 of electrically powered vehicle 100 and resonance frequencies of primary self resonant coil 240 and secondary self resonant coil 110 and the like.

Communication device 250 is a communication interface for wirelessly communicating with electrically powered vehicle 100 to be fed with electric power. ECU 260 controls high frequency electric power driver 220 so that electric power received by electrically powered vehicle 100 reaches a target value. More specifically, ECU 260 obtains from electrically powered vehicle 100 the electric power received by electrically powered vehicle 100 and its target value by using communication device 250, and controls an output of high frequency electric power driver 220 so that the power received by electrically powered vehicle 100 is equal to the target value. ECU 260 can transmit an impedance value of power feeding device 200 to electrically powered vehicle 100.

Figure 2:
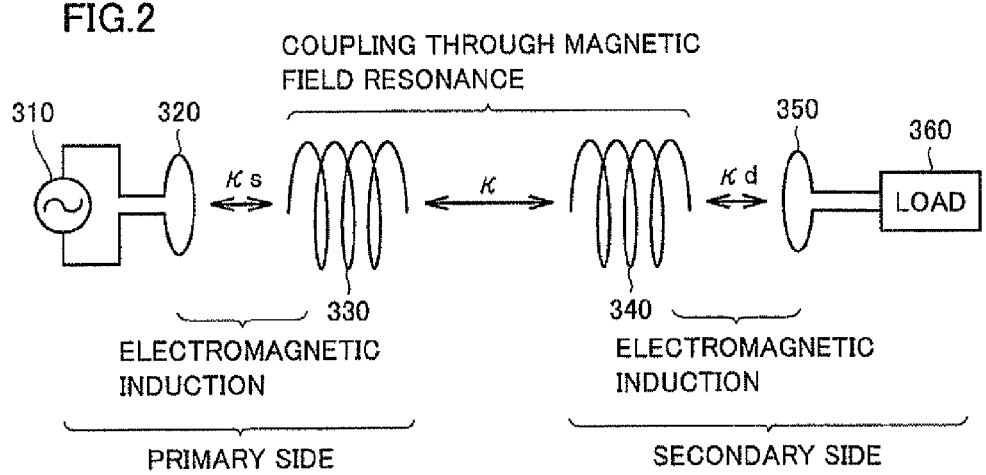
FIG. 2 is a diagram for illustrating the rationale of electric power transfer through resonance.

FIG. 2 is a diagram for illustrating the rationale of electric power transfer through resonance. According to the resonance technique illustrated in FIG. 2, two LC resonant coils having an equal natural frequency resonate with each other in an electromagnetic field (near field) in a manner similar to the resonance of two tuning forks, so that electric power is transmitted from one of the coils to the other by way of the electromagnetic field.

More specifically, primary coil 320 is connected to high frequency electric power source 310 so that primary self resonant coil 330 magnetically coupled with primary coil 320 through electromagnetic induction is fed with electric power having such a high frequency as 1 MHz to ten-odd MHz. Primary self resonant coil 330 is an LC resonator constructed from its own inductance and stray capacitance, resonating with secondary self resonant coil 340 having a resonance frequency equal to that of primary self resonant coil 330 by way of an electromagnetic field (near field). As a result, an energy (electric power) is transferred from primary self resonant coil 330 to secondary self resonant coil 340 by way of the electromagnetic field. The energy (electric power) transferred to secondary self resonant coil 340 is retrieved by secondary coil 350 magnetically coupled with secondary self resonant coil 340 through electromagnetic induction and is imparted to load 360.

Describing a correspondence relationship between FIGS. 1 and 2, alternating current power source 210 and high frequency electric power driver 220 illustrated in FIG. 1 correspond to high frequency power source 310 illustrated in FIG. 2. Further, primary coil 230 and primary self resonant coil 240 illustrated in FIG. 1 respectively correspond to primary coil 320 and primary self resonant coil 330 illustrated in FIG. 2, and secondary self resonant coil 110 and secondary coil 120 illustrated in FIG. 1 respectively correspond to secondary self resonant coil 340 and secondary coil 350 illustrated in FIG. 2. Rectifier 130 and other constitutive elements behind it illustrated in FIG. 1 are collectively illustrated as load 360.

Figure 3:
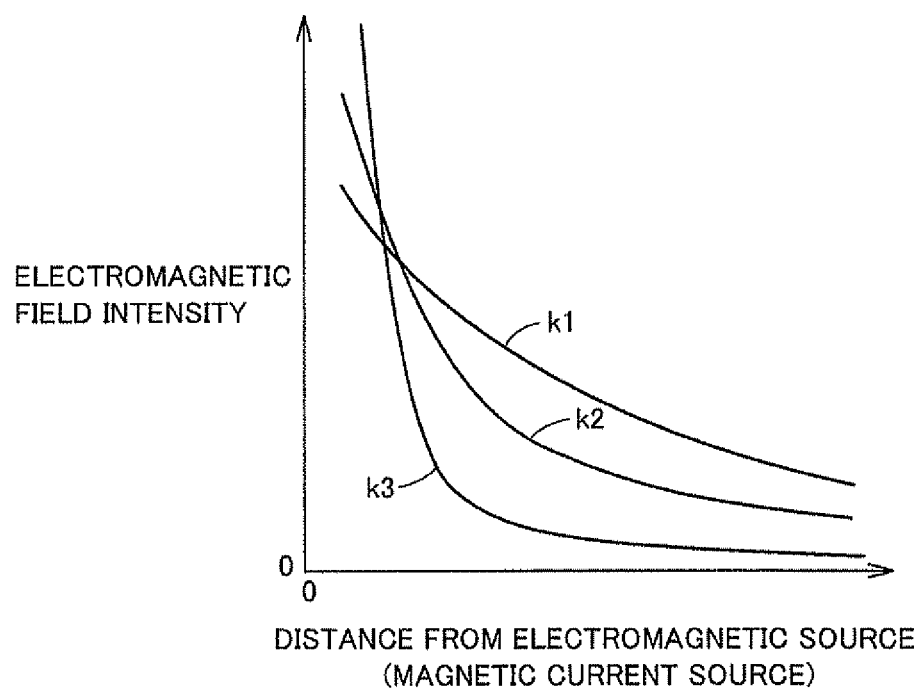
FIG. 3 is a graph illustrating a relationship between a distance from a current source (magnetic current source) and an electromagnetic field intensity.

FIG. 3 is a graph illustrating a relationship between a distance from a current source (magnetic current source) and an electromagnetic field intensity. Referring to FIG. 3, the electromagnetic field includes three components. A curve k1 is a component in inverse proportion to a distance from a wave source, generally called "radiation electromagnetic field". A curve k2 is a component in inverse proportion to the square of the distance from the wave source, generally called "induction electromagnetic field". A curve k3 is a component in inverse proportion to the cube of the distance from the wave source, generally called "static electromagnetic field".

Among these, there is a region where an electromagnetic intensity sharply drops as a function of the distance from the wave source. The resonance technique leverages this near field (evanescent field) in order to transfer an energy (electric power). More specifically, the near field is utilized to resonate a pair of resonators having equal natural frequencies (for example, a pair of LC resonant coils) to transfer the energy (electric power) from one of the resonators (a primary self resonant coil) to the other resonator (a secondary self resonant coil). The near field does not transmit the energy (electric power) over a long distance. According to the resonance technique, therefore, the power transmission can be accomplished with less energy loss than in the electromagnetic wave that transmits the energy (electric power) using the "radiation electromagnetic field" in which the energy is transmitted farther.

Figure 4:
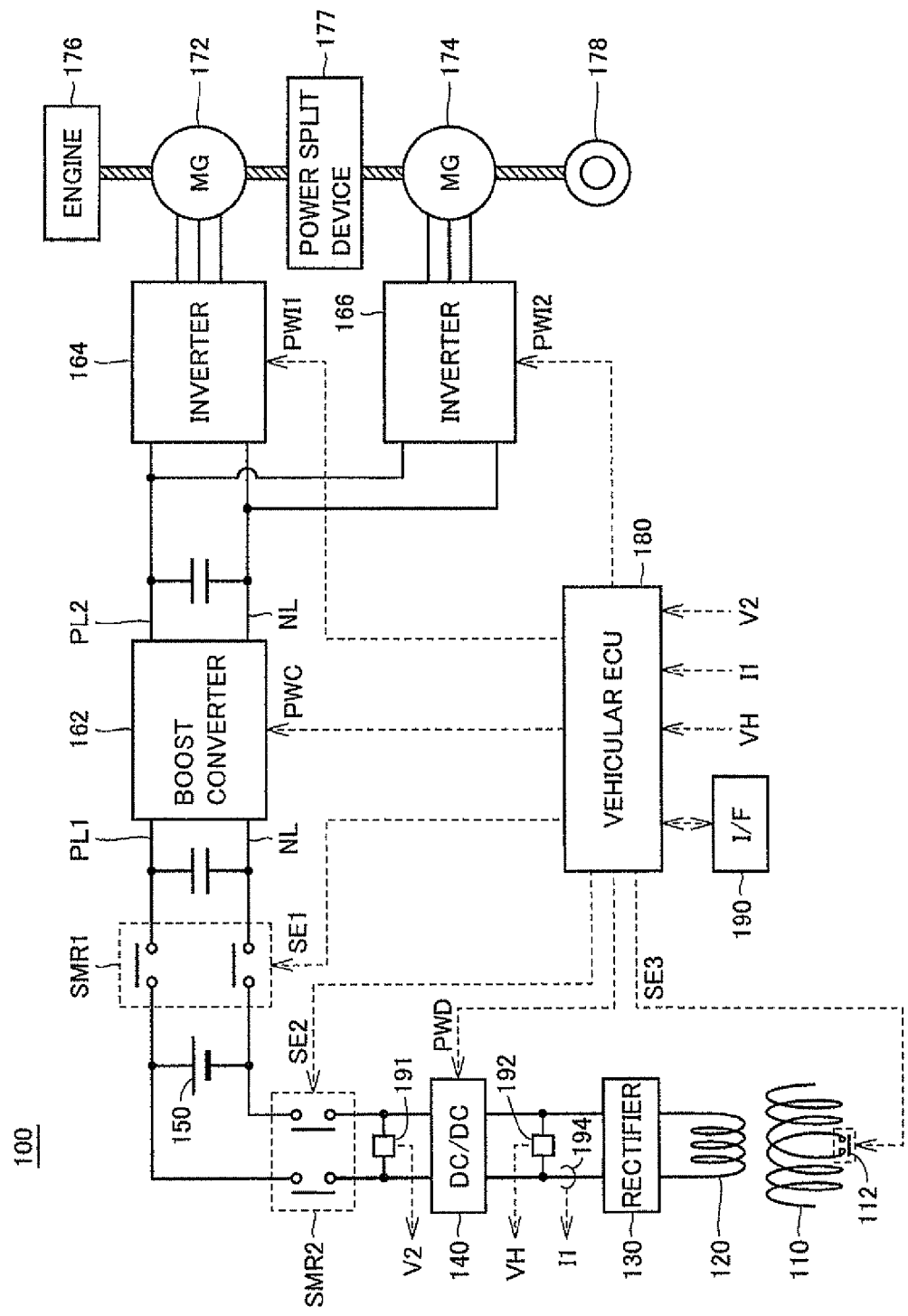
FIG. 4 is a block diagram showing a configuration of a power train of the FIG. 1 electrically powered vehicle.

FIG. 4 is a block diagram representing a powertrain configuration of electrically powered vehicle 100 of FIG. 1. Referring to FIG. 4, electrically powered vehicle 100 includes power storage device 150, a system main relay SMR1, a boost converter 162, inverters 164, 166, motor generators 172, 174, an engine 176, a power split device 177, and a driving wheel 178. Additionally, electrically powered vehicle 100 further includes secondary self resonant coil 110, secondary coil 120, rectifier 130, DC/DC converter 140, a system main relay SMR2, vehicular ECU 180, communication device 190, voltage sensors 191, 192, and a current sensor 194.

Electrically powered vehicle 100 incorporates engine 176 and motor generator 174 as the driving source, Engine 176 and motor generators 172 and 174 are coupled with power split device 177. Electrically powered vehicle 100 runs by the driving power generated by at least one of engine 176 and motor generator 174. The power generated by engine 176 is divided into two paths by power split device 177. Specifically, one path is directed to driving wheel 178, and the other path is directed to motor generator 172.

Motor generator 172 is an AC rotating electric machine including, for example, a 3-phase AC synchronous electric motor having a permanent magnet embedded in a rotor. Motor generator 172 generates electric power using the kinetic energy of engine 176 divided by power split device 177. For example, when the SOC of power storage device 150 becomes lower than a predetermined value, engine 176 is started and electric power is generated by motor generator 172, whereby power storage device 150 is charged.

Motor generator 174 is also an AC rotating electric machine including, for example, a 3-phase AC synchronous electric motor having a permanent magnet embedded in a rotor, likewise with motor generator 172. Motor generator 174 generates driving power using at least one of the electric power stored at power storage device 150 and the electric power generated by motor generator 172. The driving power of motor generator 174 is transmitted to driving wheel 178.

In a braking mode of the vehicle or in an acceleration reducing mode at a downward slope, the mechanical energy stored at the vehicle as a kinetic energy or potential energy is used for the rotational drive of motor generator 174 through driving wheel 178, whereby motor generator 174 operates as a power generator. Accordingly, motor generator 174 operates as a regenerative brake converting the running energy into electric power to generate the braking force. The electric power generated by motor generator 174 is stored in power storage device 150. Motor generator 174 corresponds to motor 170 shown in FIG. 1.

Power split device 177 includes a planetary gear set including a sun gear, a pinion gear, a carrier, and a ring gear. The pinion gear engages with the sun gear and the ring gear. The carrier supports the pinion gear to allow rotation on its axis, and is coupled to the crankshaft of engine 176. The sun gear is coupled to the rotational shaft of motor generator 172. The ring gear is coupled to the rotational shaft of motor generator 174 and to driving wheel 178.

System main relay SMR1 is disposed between power storage device 150 and boost converter 162. System main relay SMR1 electrically connects power storage device 150 with boost converter 162 when a signal SE1 from vehicular ECU 180 is rendered active, and disconnects the electrical path between power storage device 150 and boost converter 162 when signal SE1 is rendered inactive.

Boost converter 162 responds to a signal PWC from vehicular ECU 180 to boost the voltage output from power storage device 150 for output onto a positive electrode line PL2. Boost converter 162 includes a DC chopper circuit for example.

Inverters 164 and 166 are provided corresponding to motor generators 172 and 174, respectively. Inverter 164 drives motor generator 172 based on a signal PWI1 from vehicular ECU 180. Inverter 166 drives motor generator 174 based on a signal PWI2 from vehicular ECU 180. Inverters 164 and 166 include a 3-phase bridge circuit, for example.

Boost converter 162 and inverters 164 and 166 correspond to PCU 160 of FIG. 1.

Secondary self resonant coil 110 is divided at its center into two, and at the center a relay 112 is provided. In a power reception mode the vehicular ECU issues a control signal SE3 to control relay 112 to connect relay 112 and secondary self resonant coil 110 has its impedance varied to an impedance (a first state) resonating with primary self resonant coil 240 of FIG. 1. When supplying electric power is stopped, the vehicular ECU issues control signal SE3 to control relay 112 to disconnect relay 112 and secondary self resonant coil 110 has its impedance varied to an impedance (a second state) which does not resonate with primary self resonant coil 240 of FIG. 1.

Secondary coil 120, rectifier 130 and DC/DC converter 140 are as described with reference to FIG. 1 and accordingly, will not be described repeatedly. System main relay SMR2 is disposed between DC/DC converter 140 and power storage device 150. System main relay SMR2 electrically connects power storage device 150 with DC/DC converter 140 when a signal SE2 from vehicular ECU 180 is rendered active, and disconnects the electrical path between power storage device 150 and DC/DC converter 140 when signal SE2 is rendered inactive.

Voltage sensor 191 senses a voltage V2 between lines of a power transmission path between system main relay SMR2 and DC/DC converter 140, and outputs the sensed value to vehicular ECU 180. Voltage sensor 192 senses a voltage VH between lines of a power transmission path between rectifier 130 and DC/DC converter 140 to provide the sensed value to vehicular ECU 180. Current sensor 194 senses a current I1 output from rectifier 130 to provide the sensed value to vehicular ECU 180.

Vehicular ECU 180 generates signals PWC, PWI1 and PWI2 to drive boost converter 162, motor generator 172, and motor generator 174, respectively, based on the accelerator pedal position, vehicle speed, and signals from various sensors. The generated signals PWC, PWI1 and PWI2 are output to boost converter 162, inverter 164, and inverter 166, respectively.

In a vehicle running mode, vehicular ECU 180 renders signal SE1 active to turn on system main relay SMR1, and renders signal SE2 inactive to turn of system main relay SMR2. In the case where electric power can be received from the power feeding device during a running mode of the vehicle, vehicular ECU 180 may render signals SE1 and SE2 active to turn on both system main relays SMR1 and SMR2.

In a power receiving mode from power feeding device 200 external to the vehicle, vehicular ECU 180 renders signal SE1 inactive to turn off system main relay SMR1, and renders signal SE2 active to turn on system main relay SMR2.

Vehicular ECU 180 generates a signal PWD to control DC/DC converter 140, and provides the generated signal PWD to DC/DC converter 140. Vehicular ECU 180 calculates the reception electric power from power feeding device 200 based on voltage VH from voltage sensor 192 and current I1 from current sensor 194, and transmits the calculated value together with the target value of the reception electric power to power feeding device 200 through communication device 190.

Figure 5:
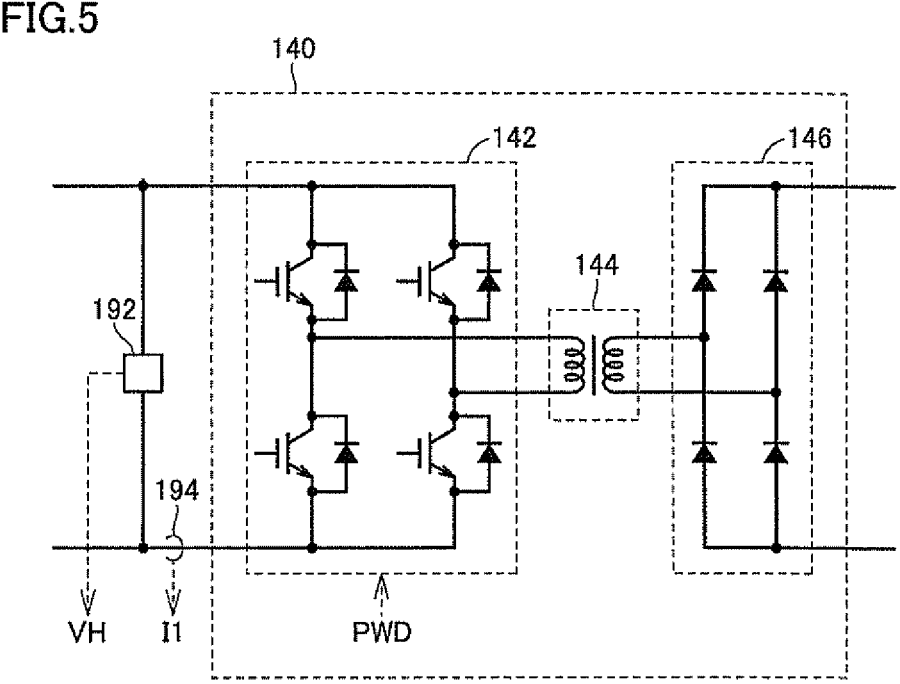
FIG. 5 is a circuit diagram of a DC/DC converter shown in FIG. 4.

FIG. 5 is a circuit diagram of DC/DC converter 140 shown in FIG. 4. Referring to FIG. 5, DC/DC converter 140 includes a DC/AC conversion unit 142, a transformer unit 144, and a rectification unit 146. DC/AC conversion unit 142 includes a switching element driven on/off based on signal PWD from vehicular ECU 180 to convert the DC power supplied from rectifier 130 of FIG. 4 into AC power for output to transformer unit 144.

Transformer unit 144 insulates DC/AC conversion unit 142 from rectification unit 146 and also carries out voltage conversion according to the coil winding ratio. Rectification unit 146 rectifies the AC power output from transformer unit 144 into DC power for output to power storage device 150 of FIG. 4.

Figure 6:
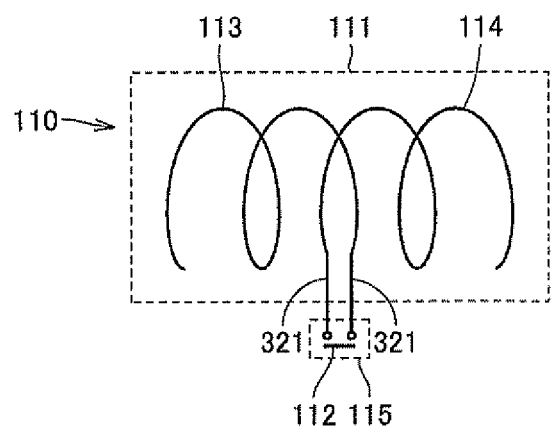
FIG. 6 specifically shows the FIG. 1, FIG. 4 secondary self resonant coil in configuration.

FIG. 6 specifically shows the FIG. 1, FIG. 4 secondary self resonant coil 110 in configuration.

With reference to FIG. 6, secondary self resonant coil 110 is configured to be switchable between a first state selected in the power reception mode and magnetically coupling secondary self resonant coil 110 with primary self resonant coil 240 shown in FIG. 1 through magnetic field resonance, and a second state selected in a non power reception mode and coupling secondary self resonant coil 110 with primary self resonant coil 240 less strongly than the first state.

Preferably, secondary self resonant coil 110 has an impedance varying between the first state and the second state.

More specifically, secondary self resonant coil 110 includes the coil's main body unit 111, and an impedance variation unit 115 varying the coil's main body unit 111 in impedance.

The coil's main body unit 111 is divided at its center into a first portion 113 and a second portion 114. Impedance variation unit 115 includes a relay 112 provided at the center of the coil's main body unit 111 and connecting first portion 113 and second portion 114 in the power reception mode and disconnecting them in the non power reception mode.

Secondary self resonant coil 110 in receiving electric power operates as if it were an antenna, and it has a voltage thereacross increased in amplitude and has a voltage of substantially zero in amplitude at its center. Accordingly, relay 112 provided at the center of the coil's main body unit 111 can be a miniature relay lower in breakdown voltage than that provided at a different portion.

In transmitting electric power through resonance when the power transmitting side is currently transmitting electric power and the resonant coils match in resonant frequency, a component mounted in the vehicle, or a secondary self resonant coil, would receive electric power even if the power receiving side does not have an intention to do so. Accordingly, as shown in FIG. 6, the secondary self resonant coil has an impedance configured to be variable and when the power receiving side does not have an intention to receive electric power the impedance is varied to prevent a resonant frequency from matching the power transmitting side.

This is preferable, as the component mounted in the vehicle does not receive electric power when unnecessary.

FIG. 7 is a perspective view of secondary self resonant coil 110 and secondary coil 120 and a vicinity thereof, and FIG. 8 is a cross section taken along a line VIII-VIII shown in FIG. 7. As shown in FIG. 7, secondary self resonant coil 110 and secondary coil 120 are accommodated in a coil accommodation unit 270.

Coil accommodation unit 270 includes a cylindrical bobbin 272 having secondary self resonant coil 110 and secondary coil 120 attached thereto, and a cover 271.

Cover 271 includes a ceiling plate 275 located over bobbin 272, a circumferential wall 274 suspended from a circumference of ceiling plate 275, and a bottom 276 immediately adjacent to a lower end of circumferential wall 274. Cover 271 internally defines an accommodation chamber having bobbin 272 accommodated therein.

Bobbin 272 is secured to bottom 276 and formed in a cylinder and to have at least one end open. Bobbin 272 is covered with cover 271 to have an opening closed to thus define an accommodation chamber 273 capable of accommodating a device therein.

Secondary self resonant coil 110 as seen along its central axis has a length shorter than its diameter. Furthermore, how many times secondary coil 120 is wound is smaller than how many times secondary self resonant coil 110 is wound; for example the former is wound approximately once and, as seen along its central axis, has a length shorter than its diameter.

Accordingly, when secondary self resonant coil 110 and secondary coil 120 are disposed coaxially, secondary self resonant coil 110 and secondary coil 120 as seen along their central axes can have a length shorter than their radial length (i.e., the bobbin 272 widthwise length).

Coil accommodation unit 270 is reduced in height, and when coil accommodation unit 270 is disposed in electrically powered vehicle 100 on a floor panel, coil accommodation unit 270 does not significantly project from the floor panel. This enhances the power reception device's mountability in electrically powered vehicle 100.

In FIG. 8, bobbin 272 includes a cylindrically formed circumferential wall 278 and a bottom 277 immediately adjacent to an end of circumferential wall 278, and accommodation chamber 273 accommodates a device therein on bottom 277.

Bottom 277 has a diameter larger than the bobbin 272 length as seen along its central axis, and accordingly on bottom 277 a large area is ensured to mount a device thereon. This can eliminate the necessity of stacking and thus securing devices, and thus allows a plurality of devices to be secured directly to bottom 277.

Accommodating a variety of types of devices in bobbin 272, as described above, allows a dead space in bobbin 272 to be utilized, and the devices can thus be mounted more efficiently.

In the FIG. 8 example, the bobbin 272 accommodation chamber 273 has accommodated therein impedance variation unit 115 connected to secondary self resonant coil 110 and rectifier 130 connected to secondary coil 120.

For secondary coil 120, a connecter 282 is provided on bobbin 272 at an inner circumferential portion, and for secondary self resonant coil 110, a connecter 283 is provided similarly on bobbin 272 at an inner circumferential portion. This allows the power reception device to be assembled in such a manner that rectifier 130 and impedance variation unit 115 can first be secured in bobbin 272 and thereafter rectifier 130 can be connected to secondary coil 120 and impedance variation unit 115 can be connected to secondary self resonant coil 110, and they can thus be connected in an efficient operation.

Secondary self resonant coil 110 and secondary coil 120 are attached to bobbin 272, and in the FIG. 7 example, secondary self resonant coil 110 is located adjacent to primary self resonant coil 240 shown in FIG. 1 and secondary coil 120 is opposite to primary self resonant coil 240 with secondary self resonant coil 110 posed therebetween.

Secondary self resonant coil 110 includes a wound portion 117 extending along the bobbin 272 outer circumferential surface and thus wound around bobbin 272 a plurality of times, and a supporting portion 116 having one end secured to bobbin 272 and capable of supporting wound portion 117. Supporting portion 116 supports wound portion 117 such that wound portion 117 is spaced from the bobbin 272 outer circumferential surface.

For a typical coil, bobbin 272 is provided at its outer circumferential surface with a helical groove, and secondary self resonant coil 110 is attached thereto. In this typical example of attachment, secondary self resonant coil 110 is configured of coiled wire having portions with bobbin 272 partially posed therebetween resulting in forming a capacitor, and as secondary self resonant coil 110 is supplied with an alternating current electric current, bobbin 272 at a portion located between the portions of the coiled wire generates heat.

In the FIG. 7 example, in contrast, secondary self resonant coil 110 having wound portion 117 spaced from the bobbin 272 outer circumferential surface and furthermore, externally exposed, can receive alternating current electric current while bobbin 272 is not significantly heated.

Wound portion 117 is divided at a center of secondary self resonant coil 110, as seen in a direction in which it extends, into first portion 113 and second portion 114. Connected to first portion 113 at an end closer to the center is a lead 321 connected to impedance variation unit 115 and secured to bobbin 272. Connected to first portion 113 at the other end is supporting portion 116 secured to bobbin 272. Connected to second portion 114 at an end closer to the center is lead 321 connected to impedance variation unit 115 and secured to bobbin 272. Connected to second portion 114 at the other end is supporting portion 116 secured to bobbin 272.

Thus, first portion 113 has its opposite ends supported by supporting portion 116 and lead 321 that are secured to bobbin 272 at a position spaced from the bobbin 272 outer circumferential surface. First portion 113 is wound along the bobbin 272 outer circumferential surface.

Similarly, second portion 114 is supported by lead 321 and supporting portion 116 at a position spaced from bobbin 272, and is wound along the bobbin 272 outer circumferential surface.

Impedance variation unit 115 is accommodated in accommodation chamber 273 and significantly adjacent to first portion 113 and second portion 114, and accordingly, lead 321 can be reduced in length and thus prevented from contributing to secondary self resonant coil 110 having a significantly varying resonant frequency.

Secondary coil 120 includes a wound portion 122 spaced from the bobbin 272 outer circumferential surface and wound along the bobbin 272 circumferential surface, and a lead 322 connected to wound portion 122 at the opposite ends. Lead 322 also extends from the wound portion 122 ends toward bobbin 272 and is secured to bobbin 272, and wound portion 122 is supported by lead 322. Note that lead 322 reaches accommodation chamber 273 defined in bobbin 272 and is connected to rectifier 130. Note that rectifier 130 is also accommodated in accommodation chamber 273 and accordingly lead 322 can be reduced in length.

Cover 271 has an internal surface, of which circumferential wall 274 and bottom 276 as shown in FIG. 7 have an internal surface provided with a shield member 280 formed for example of: copper or a similar metallic material; electrically conducting cloth including a metallic material or the like; electrically conducting sponge including a metallic material or the like; and the like. In contrast, ceiling plate 275 opposite to primary self resonant coil 240 has an internal surface without a shield member.

An electromagnetic field that is generated between secondary self resonant coil 110 and primary self resonant coil 240 is reflected by shield member 280 and thus restrained from leaking outward from shield member 280. Ceiling plate 275 that is not provided with shield member 280 passes an electromagnetic wave and primary self resonant coil 240 and secondary self resonant coil 110 transmit/receive electric power to/from each other. The electromagnetic field's leakage can thus be reduced/prevented and secondary self resonant coil 110 and primary self resonant coil 240 can receive electric power from each other more efficiently.

Bobbin 272 also has an internal, circumferential surface provided with a shield member 281. This can reduce/prevent an electromagnetic wave reaching the interior of bobbin 272 and thus prevent impedance variation unit 115 and rectifier 130 accommodated in bobbin 272 from contributing to significantly varying the resonant frequency of secondary self resonant coil 110.

Figure 9:
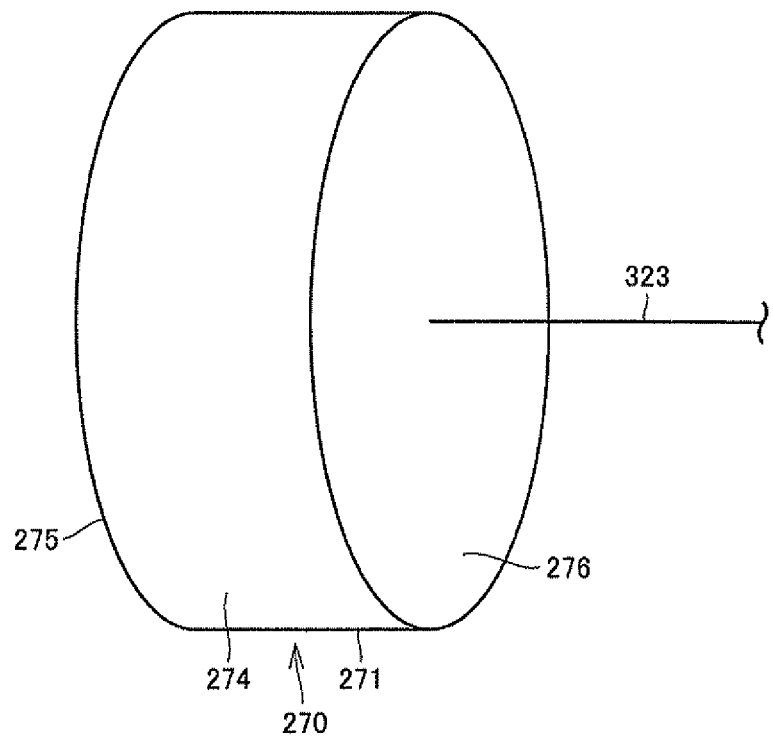
FIG. 9 is a perspective view of a coil accommodation unit as seen from a bottom of a cover.

FIG. 9 is a perspective view of coil accommodation unit 270 as seen at the cover 271 bottom 276. As shown in FIG. 9, rectifier 130 and converter 140 shown in FIG. 1 are connected by a lead drawn out at the center of bottom 276.

Second Embodiment

A second embodiment provides a variation in configuration of secondary self resonant coil 110 according to the first embodiment as shown in FIG. 4 and FIG. 6. The remainder in configuration is similar to the first embodiment, and accordingly, will not be described repeatedly.

Figure 10:
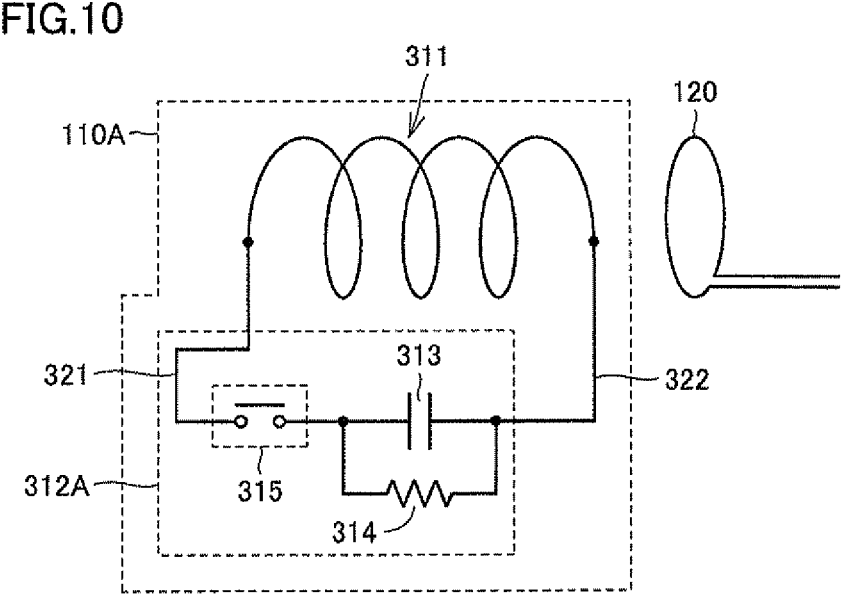
FIG. 10 is a circuit diagram showing a configuration of a secondary self resonant coil used in a non contact power reception device of a second embodiment.

FIG. 10 is a circuit diagram showing a configuration of a secondary self resonant coil 110A used in a non contact power reception device of the second embodiment.

Figure 11:
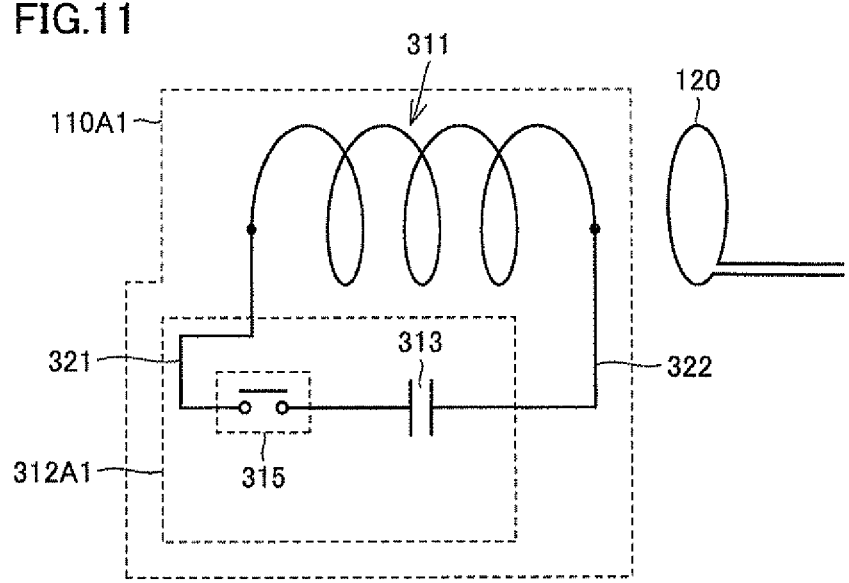
FIG. 11 is a circuit diagram showing a configuration of a secondary self resonant coil 110A in an exemplary variation, or a secondary self resonant coil 110A1.

With reference to FIG. 10 and FIG. 11, secondary self resonant coil 110A1 corresponds in configuration to secondary self resonant coil 110A having capacitance variation unit 312A replaced with capacitance variation unit 312A1. Capacitance variation unit 312A1 corresponds in configuration to the FIG. 10 capacitance variation unit 312A having discharging resistor 314 removed therefrom, and has the remainder identical to capacitance variation unit 312A and accordingly, will not be described repeatedly.

Secondary self resonant coil 110A has an impedance varying between the first state and the second state. More specifically, secondary self resonant coil 110A includes the coil's main body unit 311, and a capacitance variation unit 312A varying the coil's main body unit 311 in capacitance.

Capacitance variation unit 312A includes lead 321 connected to an end of the coil's main body unit, a relay 315 connected to lead 321, and a capacitor 313 that is connected by relay 315 via lead 321 to the coil's main body unit 311 in the power reception mode and that is disconnected by relay 315 from the coil's main body unit 311 in the non power reception mode.

Secondary self resonant coil 110A further includes a discharging resistor 314 causing capacitor 313 to have an electrically discharged state in the non power reception mode. Discharging resistor 314 is connected between the opposite electrodes of capacitor 313. Capacitor 313 is connected between a lead 322 connected to the other end of the coil's main body unit 311 and relay 315.

FIG. 11 is a circuit diagram showing a configuration of secondary self resonant coil 110A in an exemplary variation, i.e., a secondary self resonant coil 110A1. With reference to FIG. 10 and FIG. 11, secondary self resonant coil 110A1 corresponds in configuration to secondary self resonant coil 110A having capacitance variation unit 312A replaced with capacitance variation unit 312A1. Capacitance variation unit 312A1 corresponds in configuration to the FIG. 10 capacitance variation unit 312 having discharging resistor 314 removed therefrom, and has the remainder identical to capacitance variation unit 312 and accordingly, will not be described repeatedly.

Figure 12:
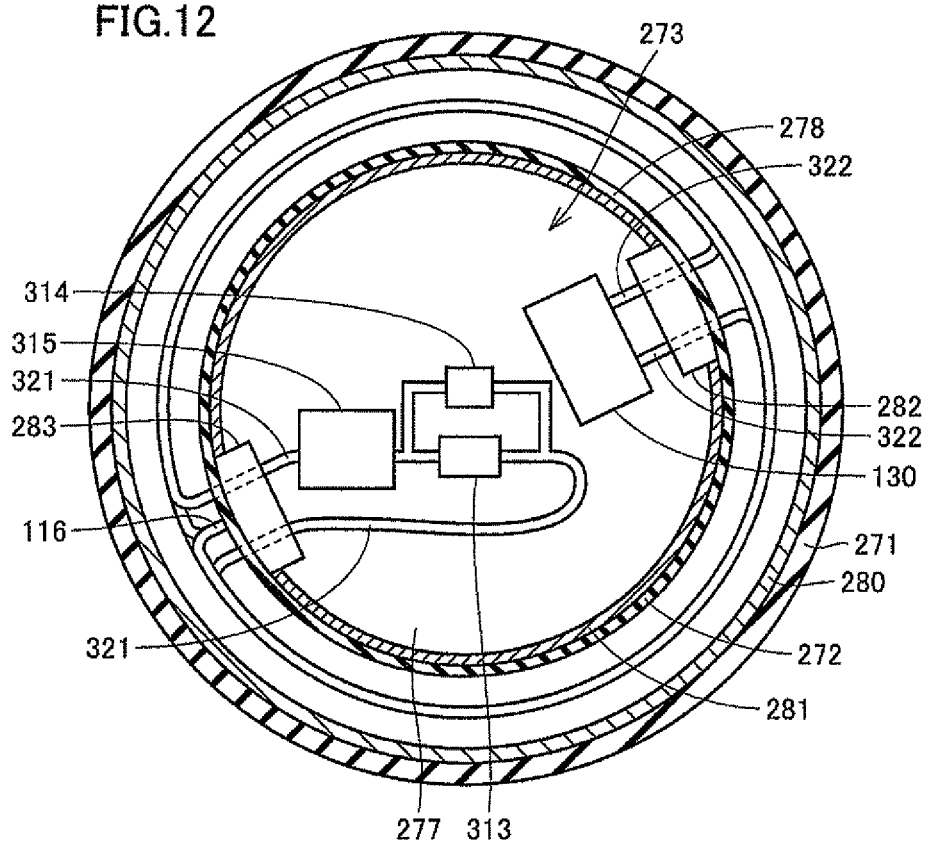
FIG. 12 is a cross section of a coil accommodation unit having the FIG. 10 secondary self resonant coil and secondary coil accommodated therein.

FIG. 12 is a cross section of coil accommodation unit 270 having the FIG. 10 secondary self resonant coil 110A and secondary coil 120 accommodated therein.

In the FIG. 12 example, the bobbin 272 accommodation chamber 273 has accommodated therein rectifier 130 connected to secondary coil 120, and relay 315, capacitor 313 and discharging resistor 314 connected to the coil's main body unit 311.

The FIG. 10 and FIG. 12 example also allows a compact power reception device.

Figure 13:
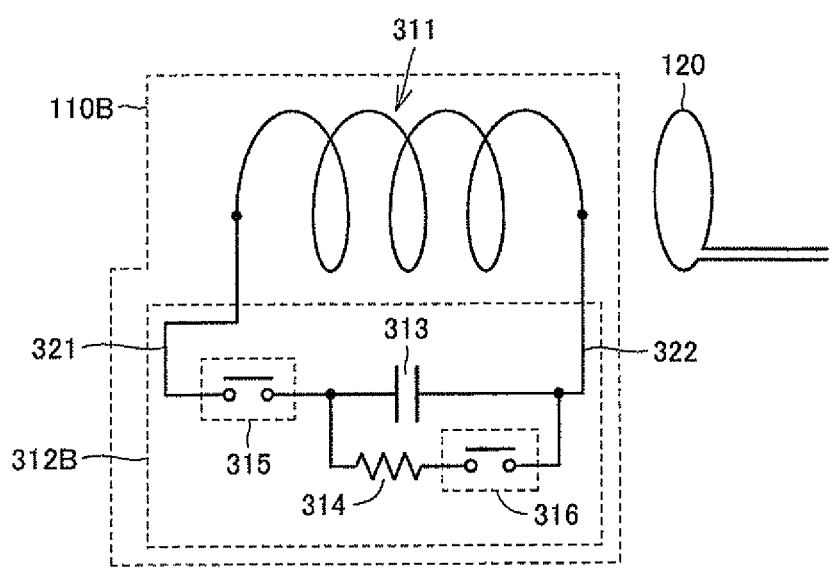
FIG. 13 is a circuit diagram showing a configuration of a secondary self resonant coil in an exemplary variation of a secondary self resonant coil.

FIG. 13 is a circuit diagram showing a configuration of secondary self resonant coil 110A in an exemplary variation, or a secondary self resonant coil 110B.

With reference to FIG. 10 and FIG. 13, secondary self resonant coil 110B corresponds in configuration to secondary self resonant coil 110A having capacitance variation unit 312A replaced with a capacitance variation unit 312B.

Capacitance variation unit 312B includes lead 321 connected to an end of the coil's main body unit, relay 315 connected to lead 321, and capacitor 313 that is connected by relay 315 via lead 321 to the coil's main body unit 311 in the power reception mode and that is disconnected by relay 315 from the coil's main body unit 311 in the non power reception mode.

Secondary self resonant coil 110B further includes discharging resistor 314 causing capacitor 313 to have an electrically discharged state in the non power reception mode.

Secondary self resonant coil 110B further includes another relay 316 that disconnects discharging resistor 314 from capacitor 313 in the power reception mode and that connects the discharging resistor to the capacitor in the non power reception mode.

Discharging resistor 314 and the other relay 316 are connected in series between the opposite electrodes of capacitor 313. Capacitor 313 is connected between lead 322 connected to the other end of the coil's main body unit 311 and relay 315.

In the power reception mode, the FIG. 4 vehicular ECU 180 turns on relay 315 and turns off relay 316, and in the non power reception mode, the FIG. 4 vehicular ECU 180 turns off relay 315 and turns on relay 316.

Figure 14:
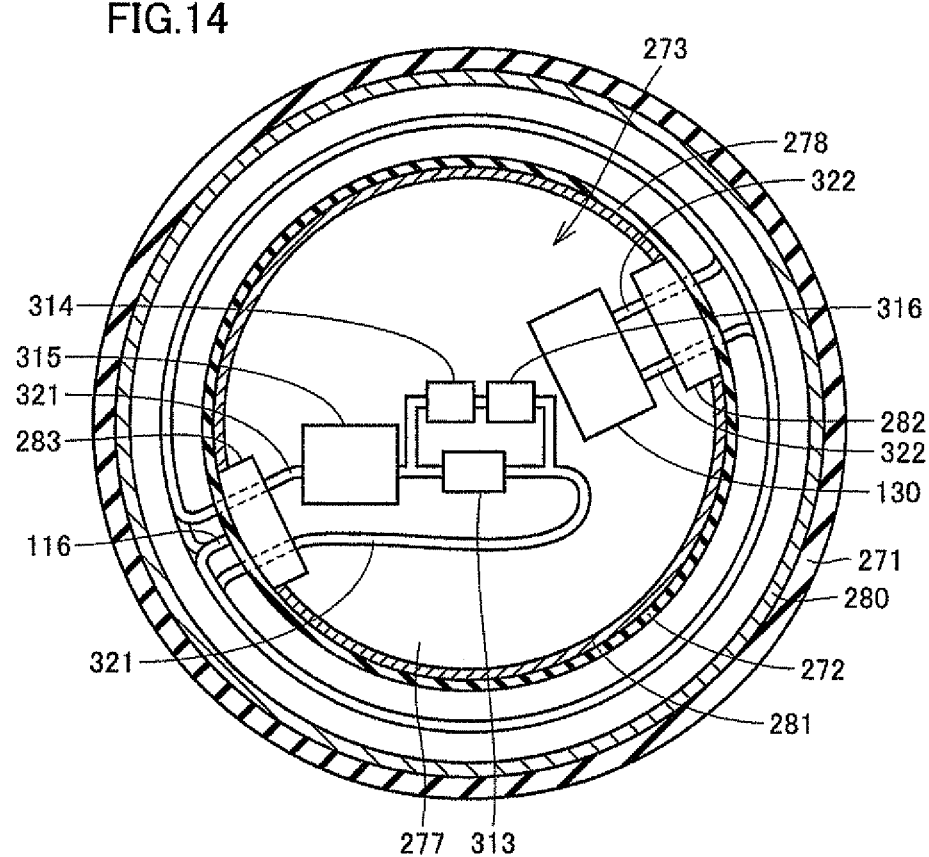
FIG. 14 is a cross section of a coil accommodation unit 270 having the FIG. 13 secondary self resonant coil and secondary coil accommodated therein.

FIG. 14 is a cross section of coil accommodation unit 270 having the FIG. 13 secondary self resonant coil 110B and secondary coil 120 accommodated therein.

In the FIG. 14 example, relay 315, capacitor 313, discharging resistor 314 and relay 316 connected to the coil's main body unit are accommodated in bobbin 272 at accommodation chamber 273. Furthermore, accommodation chamber 273 has accommodated therein rectifier 130 connected to secondary coil 120.

The FIG. 13 and FIG. 14 example also allows a compact power reception device.

Figure 15:
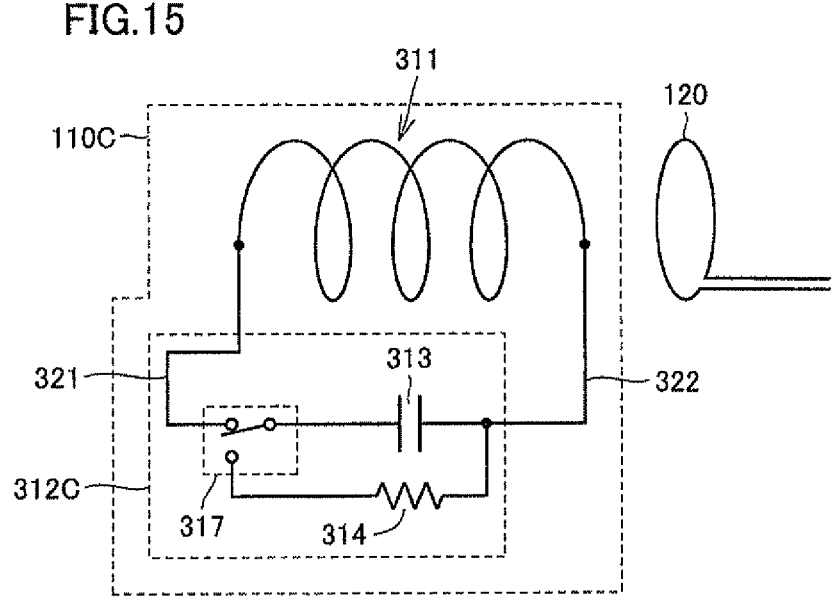
FIG. 15 is a circuit diagram showing a configuration of a secondary self resonant coil in another exemplary variation of a secondary self resonant coil.

FIG. 15 is a circuit diagram showing a configuration of secondary self resonant coil 110A in another exemplary variation, or a secondary self resonant coil 110C.

With reference to FIG. 10 and FIG. 15, secondary self resonant coil 110C corresponds in configuration to secondary self resonant coil 110A having capacitance variation unit 312A replaced with a capacitance variation unit 312C.

Capacitance variation unit 312C includes lead 321 connected to an end of the coil's main body unit, a relay 317 connected to lead 321, and capacitor 313 that is connected by relay 317 via lead 321 to the coil's main body unit 311 in the power reception mode and that is disconnected by the relay from the coil's main body unit 311 in the non power reception mode.

Secondary self resonant coil 110C further includes discharging resistor 314 causing capacitor 313 to have an electrically discharged state in the non power reception mode.

In the power reception mode, relay 317 disconnects discharging resistor 314 from capacitor 313, and in the non power reception mode, relay 317 connects discharging resistor 314 to capacitor 313.

In the power reception mode, vehicular ECU 180 controls relay 317 to connect an end of the coil's main body unit 311 to one end of the capacitor and disconnect discharging resistor 314 from that one end. In the non power reception mode, vehicular ECU 180 controls relay 317 to disconnect an end of the coil's main body unit 311 from one end of the capacitor and connect that one end of the capacitor to discharging resistor 314.

Figure 16:
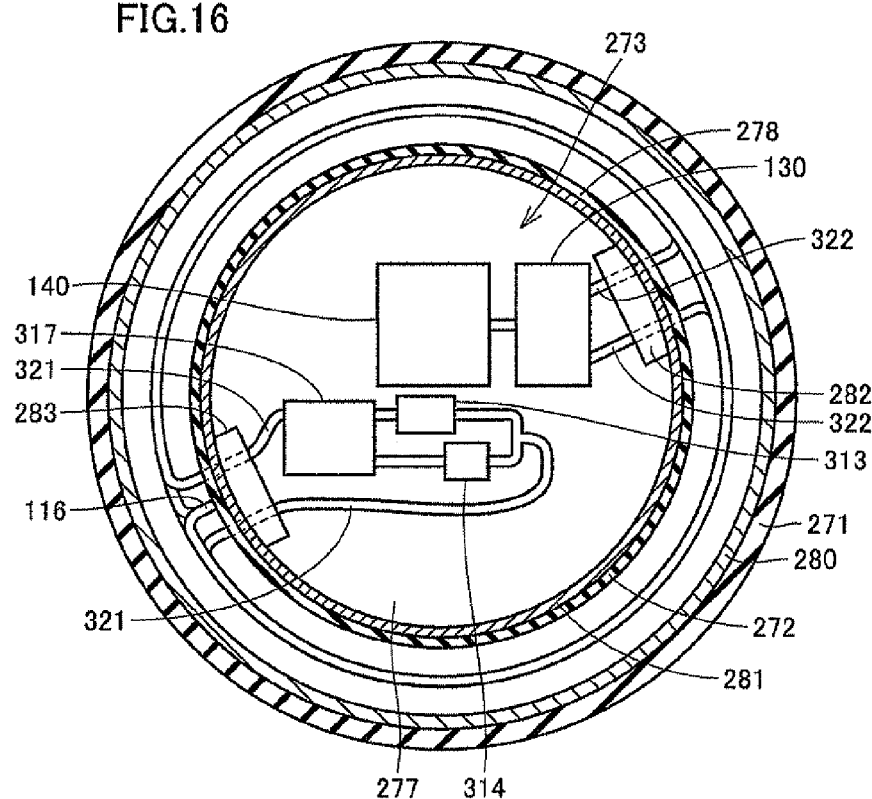
FIG. 16 is a cross section of coil accommodation unit 270 having the FIG. 15 secondary self resonant coil and secondary coil accommodated therein.

FIG. 16 is a cross section of coil accommodation unit 270 having the FIG. 15 secondary self resonant coil 110C, secondary coil 120 and the like accommodated therein.

In the FIG. 16 example, relay 317, capacitor 313 and discharging resistor 314 connected to the coil's main body unit, and rectifier 130 and converter (a voltage converter) 140 connected to secondary coil 120 are accommodated, and a compact power reception device can be achieved.

Accommodation chamber 273 is not limited as described above in what device it has accommodated therein; for example, it may have vehicular ECU 180, communication device 190, a temperature sensor and the like accommodated therein.

As has been described above, in the present embodiment, when the power feeding device transmits electric power and the vehicle does not need to receive electric power, the vehicle does not have any portion receiving electric power through resonance, and a compact power reception device can also be achieved.

Third Embodiment

Figure 17:
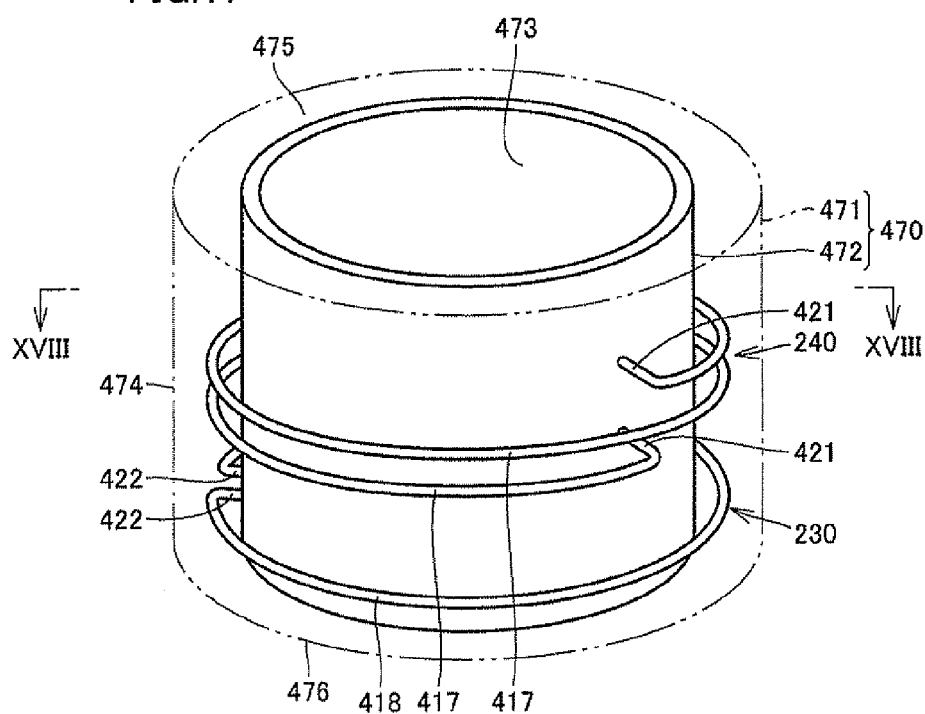
FIG. 17 is a perspective view of a coil accommodation unit having a power feeding device's primary self resonant coil and primary coil accommodated therein.
Figure 18:
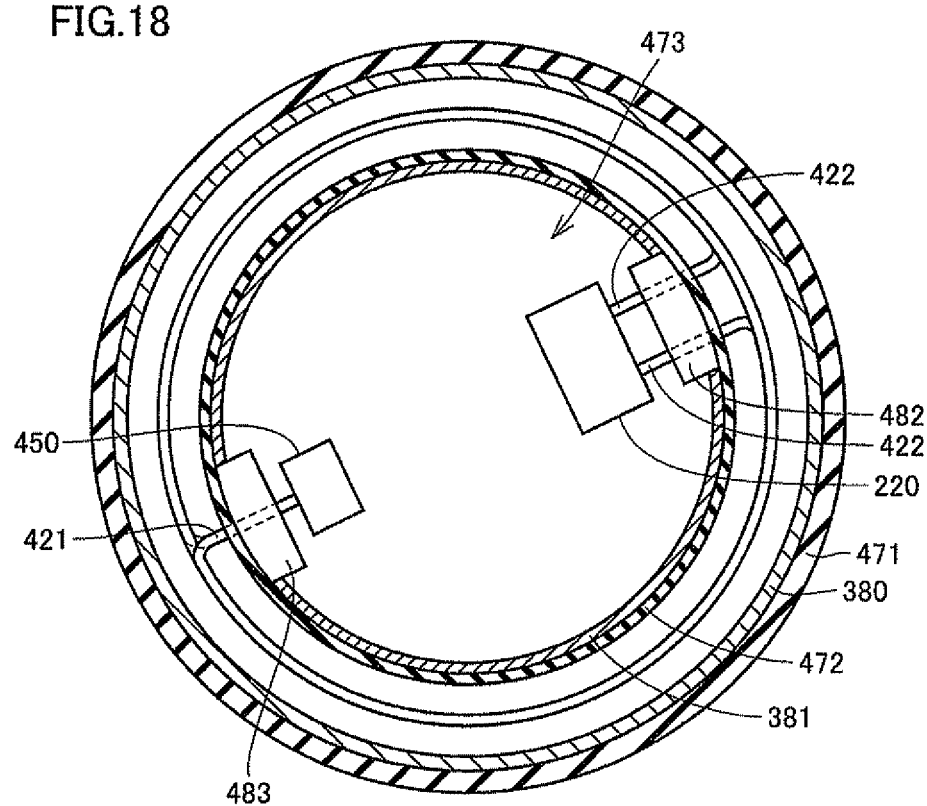
FIG. 18 is a cross section taken along a line XVIII-XVIII shown in FIG. 17.

With reference to FIG. 17 and FIG. 18, the present invention is applied to power feeding device 200 in an example, as will be described hereinafter. FIG. 17 is a perspective view of a coil accommodation unit 470 having primary self resonant coil 240 and primary coil 230 accommodated therein and FIG. 18 is a cross section taken along a line XVIII-XVIII shown in FIG. 17.

As shown in FIG. 17 and FIG. 18, coil accommodation unit 470 includes a bobbin 472 having primary self resonant coil 240 and primary coil 230 attached thereto, and a cover 471 covering bobbin 472.

Bobbin 472 is cylindrically formed and therein an accommodation chamber 473 capable of accommodating a device therein is defined. Accommodation chamber 473 has accommodated therein a capacitor 450 connected to primary self resonant coil 240 and a high frequency power driver (frequency converter) 220 connected to primary coil 230, Power feeding device 200 can thus be compact. Accommodation chamber 473 is not limited as described above in what device it has accommodated therein; for example, it may have communication device 250, ECU 260 and the like accommodated therein. The present invention is thus applicable not only to a power reception device but also power feeding device 200.

Coil accommodation unit 470 also includes bobbin 472 having an internal circumferential surface provided with a shield member 381, and cover 471 having an internal circumferential surface provided with a shield member 380.

Furthermore, primary self resonant coil 240 includes a wound portion 417 extending along the bobbin 472 outer circumferential surface and spaced from the bobbin 472 outer circumferential surface, and a lead 421 provided at the opposite ends of wound portion 417 and connected to capacitor 450. Lead 421 is secured to bobbin 472 and supports wound portion 417.

Likewise, primary coil 230 also includes a wound portion 418 wound along the bobbin 472 outer circumferential surface and a lead 422 provided at the opposite ends of wound portion 418 and connected to high frequency electric power driver 220. Wound portion 418 is spaced from the bobbin 472 outer circumferential surface and thus secured by lead 421.

Note that while each above embodiment has been described with an electrically powered vehicle that is a series/parallel hybrid car capable of splitting a mechanical power of engine 176 using power split device 177 and transmitting the split mechanical powers to driving wheel 178 and motor generator 172, as shown in FIG. 4, the present invention is also applicable to hybrid cars of other types. More specifically, the present invention is also applicable for example to such hybrid cars as: a generally-called series hybrid car where engine 176 is exclusively used for driving motor generator 172, and a vehicle drive force is generated solely by motor generator 174; a hybrid car where, of a kinetic energy generated by engine 176, a regenerative energy alone is collected as an electric energy; a motor-assisted hybrid car where an engine is used as a principal mechanical power with occasional assistance from a motor whenever necessary; and the like.

The present invention is also applicable to an electric car dispensing with engine 176 and traveling on electric power alone, a fuel battery car provided with a fuel battery as a direct current power source in addition to power storage device 150. The present invention is also applicable to an electrically powered vehicle without boost converter 162.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A non-contact electric power transfer device comprising:
    a first self-resonant coil at least one of transmitting and receiving electric power to and from an opposite, second self-resonant coil through a magnetic field resonance;
    an induction coil at least one of extracting the electric power that the first self-resonant coil received through electromagnetic induction, and feeding the first self-resonant coil with electric power through electromagnetic induction; and
    an accommodation chamber formed in an air core portion of the first self-resonant coil and the induction coil, the accommodation chamber accommodating a device therein.

2. The non-contact electric power transfer device according to claim 1, wherein the first self-resonant coil and the induction coil are mounted in a vehicle, the second self-resonant coil is disposed external to the vehicle, the second self-resonant coil transfers electric power to the first self-resonant coil, the first self-resonant coil receives the electric power transferred from the second self-resonant coil, and the first self-resonant coil and the induction coil configure at least a portion of a power reception device.

3. The non-contact electric power transfer device according to claim 1, wherein the second self-resonant coil is mounted in a vehicle, the first self-resonant coil and the induction coil are disposed external to the vehicle, the first self-resonant coil transfers electric power to the second self-resonant coil, the second self-resonant coil receives the electric power transferred from the first self-resonant coil, and first self-resonant coil and the induction coil configure at least a portion of a power transmission device.

4. The non-contact electric power transfer first self-resonant coil attached thereto, wherein the accommodation chamber is defined in the bobbin.

5. The non-contact electric power transfer device according to claim 4, wherein the bobbin has an axial width smaller than a width of the bobbin.

6. The non-contact electric power transfer device according to claim 4, wherein the device accommodated in the bobbin at the accommodation chamber includes a capacitor connected to the first self-resonant coil.

7. The non-contact electric power transfer device according to claim 6, wherein the device accommodated in the bobbin at the accommodation chamber is adapted to be a switching device switching a first state selected in a power reception mode and having the first self-resonant coil magnetically coupled with the second self-resonant coil through magnetic field resonance, and a second state selected in a non-power reception mode and having the first self-resonant coil magnetically coupled with the second self-resonant coil through resonance less strongly than the first state.

8. The non-contact electric power transfer device according to claim 4, wherein the first self-resonant coil includes:
   a wound portion spaced from an outer circumferential surface of the bobbin and wound along the outer circumferential surface of the bobbin; and
   a supporting portion connected to the bobbin and supporting the wound portion.

9. The non-contact electric power transfer device according to claim 1, wherein:
   the first self-resonant coil includes a main body unit and an impedance variation unit varying the main body unit in inductance; and
   the impedance variation unit is accommodated in the accommodation chamber.

10. The non-contact electric power transfer device according to claim 9, wherein:
    the main body unit is divided at a center thereof into a first portion and a second portion;
    the impedance variation unit includes a relay provided at the center of the main body unit and connecting the first portion and the second portion in a power reception mode and disconnecting the first portion and the second portion in a non-power reception mode; and
    the relay is accommodated in the accommodation chamber.

11. The non-contact electric power transfer device according to claim 1, wherein:
    the first self-resonant coil includes the main body unit and a capacitance variation unit varying the main body unit in capacitance; and
    the capacitance variation unit is accommodated in the accommodation chamber.

12. The non-contact electric power transfer device according to claim 11, wherein:
    the capacitance variation unit includes a lead connected to an end of the main body unit, a relay connected to the lead, and a capacitor connected by the relay via the lead to the main body unit in a power reception mode and disconnected by the relay from the main body in a non-power reception mode; and
    at least one of the relay and the capacitor is accommodated in the accommodation chamber.

13. The non-contact electric power transfer device according to claim 1, further comprising a rectifier connected to the induction coil, wherein the rectifier is accommodated in the accommodation chamber.

14. The non-contact electric power transfer device according to claim 1, further comprising a voltage converter connected to the induction coil, wherein the voltage converter is accommodated in the accommodation chamber.

15. A vehicle comprising the non-contact electric power transfer device according to claim 1.

* * * * *